United States Patent
Kipersztok et al.

(10) Patent No.: US 7,209,814 B2
(45) Date of Patent: *Apr. 24, 2007

(54) DIAGNOSTIC SYSTEM AND METHOD FOR ENABLING MULTISTAGE DECISION OPTIMIZATION FOR AIRCRAFT PREFLIGHT DISPATCH

(75) Inventors: Oscar Kipersztok, Redmond, WA (US); Glenn A. Dildy, Redmond, WA (US)

(73) Assignee: The Boeing Company, Chicago, IL (US)

( * ) Notice: Subject to any disclaimer, the term of this patent is extended or adjusted under 35 U.S.C. 154(b) by 43 days.

This patent is subject to a terminal disclaimer.

(21) Appl. No.: 10/799,989

(22) Filed: Mar. 12, 2004

(65) Prior Publication Data

US 2004/0199307 A1    Oct. 7, 2004

Related U.S. Application Data

(63) Continuation of application No. 10/310,165, filed on Dec. 4, 2002, now Pat. No. 6,751,536.

(51) Int. Cl.
*G06F 19/00* (2006.01)
(52) U.S. Cl. ............... 701/29; 702/183; 714/25; 382/149
(58) Field of Classification Search ........... 701/29, 701/34, 100, 30, 3, 209, 14; 340/945, 963, 340/439; 702/182, 183, 185; 244/1 R; 714/47, 714/30, 4, 25; 382/149
See application file for complete search history.

(56) References Cited

U.S. PATENT DOCUMENTS 4,602,127 A * 7/1986 Neely et al. ............ 379/68

| 4,796,206 A | 1/1989 | Boscover et al. |
| 4,943,919 A | 7/1990 | Aslin et al. |
| 4,954,964 A | 9/1990 | Singh |

(Continued)

FOREIGN PATENT DOCUMENTS

JP    401021700 A    1/1989

(Continued)

OTHER PUBLICATIONS

Notice of Allowability, U.S. Appl. No. 10/310,165, Kipersztok, et al., dated Jan. 23, 2004, 7 pages.

(Continued)

*Primary Examiner*—Tuan C To
(74) *Attorney, Agent, or Firm*—Harness, Dickey & Pierce, P.L.C.

(57) ABSTRACT

A diagnostic system and method for enabling multistage decision optimization in aircraft preflight dispatch. The diagnostic system includes an interface for receiving one or more inputs relating to one or more observed symptoms indicative of a failed component in an aircraft. The diagnostic system extends an entropy-based value of information (VOI) diagnostic model by adding an explicit value function into the VOI diagnostic model to accommodate various variables associated with the aircraft preflight dispatch problem. The construction of the entropy-based VOI diagnostic model and thus the extended VOI diagnostic model are both based upon at least one of systemic information relating to aircraft components and input-output relationships of the aircraft components, experience-based information relating to direct relationships between aircraft component failures and observed symptoms, and factual information relating to aircraft component reliability.

26 Claims, 6 Drawing Sheets

U.S. PATENT DOCUMENTS

| | | | |
|---|---|---|---|
| 5,010,487 A | | 4/1991 | Stonehocker |
| 5,023,791 A | | 6/1991 | Herzberg et al. |
| 5,025,392 A | | 6/1991 | Singh |
| 5,036,479 A | | 7/1991 | Prednis et al. |
| 5,099,436 A | | 3/1992 | McCown et al. |
| 5,111,402 A | * | 5/1992 | Brooks et al. ............... 701/35 |
| 5,161,158 A | | 11/1992 | Chakravarty et al. |
| 5,184,312 A | | 2/1993 | Ellis |
| 5,270,920 A | | 12/1993 | Pearse et al. |
| 5,293,323 A | | 3/1994 | Doskocil et al. |
| 5,396,422 A | | 3/1995 | Forchert et al. |
| 5,400,018 A | * | 3/1995 | Scholl et al. ............. 340/10.3 |
| 5,408,412 A | | 4/1995 | Hogg et al. |
| 5,442,553 A | * | 8/1995 | Parrillo ...................... 455/420 |
| 5,479,610 A | | 12/1995 | Roll-Mecak et al. |
| 5,522,026 A | | 5/1996 | Taylor et al. |
| 5,524,272 A | | 6/1996 | Padowski et al. |
| 5,544,308 A | | 8/1996 | Giordano et al. |
| 5,592,614 A | | 1/1997 | Peters |
| 5,737,227 A | | 4/1998 | Greenfield et al. |
| 5,748,846 A | | 5/1998 | Kirkland et al. |
| 5,796,935 A | | 8/1998 | Morrison et al. |
| 5,828,969 A | * | 10/1998 | Chamney et al. ............. 701/29 |
| 5,838,261 A | * | 11/1998 | Lauta et al. ................ 340/945 |
| 5,919,267 A | | 7/1999 | Urnes et al. |
| 5,931,877 A | * | 8/1999 | Smith et al. .................. 701/29 |
| 5,987,443 A | | 11/1999 | Nichols et al. |
| 6,003,021 A | | 12/1999 | Zadik et al. |
| 6,003,808 A | | 12/1999 | Nguyen et al. |
| 6,012,512 A | | 1/2000 | Douik et al. |
| 6,064,998 A | | 5/2000 | Zabloudil et al. |
| 6,067,486 A | * | 5/2000 | Aragones et al. ............. 701/29 |
| 6,067,537 A | | 5/2000 | O'Connor et al. |
| 6,067,538 A | | 5/2000 | Zorba et al. |
| 6,073,127 A | | 6/2000 | Lannert et al. |
| 6,085,184 A | | 7/2000 | Bertrand et al. |
| 6,122,275 A | | 9/2000 | Schmidt et al. |
| 6,301,531 B1 | | 10/2001 | Pierro et al. |
| 6,505,106 B1 | | 1/2003 | Lawrence et al. |
| 6,529,620 B2 | | 3/2003 | Thompson |
| 6,574,537 B2 | | 6/2003 | Kipersztok et al. |
| 6,591,182 B1 | | 7/2003 | Cece et al. |
| 6,606,546 B2 | | 8/2003 | Sinex |
| 6,633,801 B1 | | 10/2003 | Durlacher et al. |
| 6,643,569 B2 | | 11/2003 | Miller et al. |
| 6,892,317 B1 | * | 5/2005 | Sampath et al. ............... 714/4 |
| 7,013,410 B2 | * | 3/2006 | Asauchi ...................... 714/46 |
| 2003/0158705 A1 | * | 8/2003 | Ishii et al. .................. 702/183 |
| 2003/0182083 A1 | * | 9/2003 | Schwenke et al. .......... 702/183 |
| 2003/0191563 A1 | | 10/2003 | Eagleton et al. |
| 2003/0195675 A1 | | 10/2003 | Felke et al. |
| 2003/0216889 A1 | * | 11/2003 | Marko et al. ............... 702/182 |
| 2004/0034456 A1 | * | 2/2004 | Felke et al. ................... 701/29 |
| 2004/0064225 A1 | * | 4/2004 | Jammu et al. ................ 701/29 |
| 2005/0004821 A1 | * | 1/2005 | Garrow et al. ................. 705/7 |

OTHER PUBLICATIONS

Carl A. Palmer; *Combining Bayesian Belief Networks With Gas Path Analysis For Test Cell Diagnostics and Overhaul*; 9 pages; Presented at the International Gas Turbine & Aeroengine Congress & Exhibition, Stockholm, Sweden.

U.S. Appl. No. 10/375,814, filed Feb. 2003, Kipersztok et al.

Haiqin Wang & Marek J. Druzdzel, Decision Systems Laboratory, School of Information Sciences and Intellligent Systems Program, University of Pittsburgh, Pittsburgh, PA 15260; *User Interface Tools for Navigation in Conditional Probability Tables and Elicitation of Probabilities in Bayesian Networks*; 9 pages.

Max Henrion, Department of Engineering and Public Policy, and Department of Social and Decision Science, Carnegie Mellon University, Pittsburgh, PA 15213; *Practical Issues in Constructing a Bayaes' Belief Network*; pp. 132-139.

S.O. Lauritzen & D.J. Spiegelhalter, *Local Computations with Probabilities on Graphical Structures and Their Application to Expert Systems*; 1988 Royal Satistical Society; pp. 415-448.

\* cited by examiner

DIAGNOSTIC SYSTEM AND METHOD FOR ENABLING MULTISTAGE DECISION OPTIMIZATION FOR AIRCRAFT PREFLIGHT DISPATCH

CROSS-REFERENCE TO RELATED APPLICATION

This application is a continuation of presently allowed U.S. patent application Ser. No. 10/310,165, filed on Dec. 4, 2002 now U.S. Pat. No. 6,751,536. The entire disclosure of which is incorporated herein by reference.

COPYRIGHT NOTICE

A portion of the disclosure of this document contains material that is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

FIELD OF THE INVENTION

The present invention relates generally to diagnostic systems and methods, and more particularly to diagnostic systems and methods for enabling multistage decision optimization for aircraft preflight dispatch.

BACKGROUND OF THE INVENTION

Aircraft maintenance, including reliable troubleshooting, is of paramount importance to ensure the continued safe and efficient operation of aircraft. Aircraft maintenance can occur in several different manners. For example, scheduled maintenance generally includes a number of specific tasks, inspections and repairs that are performed at predetermined intervals. These events are scheduled in advance and rarely result in aircraft schedule interruption. In contrast, unscheduled maintenance is performed as required to maintain the aircraft's allowable minimum airworthiness during intervals between scheduled maintenance. Unscheduled maintenance is usually performed while the aircraft is on the ground between flights. However, unscheduled maintenance may be performed during a scheduled maintenance check if a mechanic identifies a problem that was not anticipated. Minimum ground time between flights is desirable to maximize aircraft utilization and to meet the established flight schedules. Therefore, the time allocated to unscheduled maintenance is often limited to the relatively short time that the aircraft is required to be at the gate in order to permit passengers to unload and load, to refuel and to otherwise service the aircraft.

Although modern datalink communications facilitate preflight troubleshooting by allowing pilots or maintenance operators to note a problem (e.g., component failure) during the last flight leg or while the aircraft is on the ground, it is oftentimes difficult to troubleshoot the aircraft and complete unscheduled maintenance before the departure time of the next scheduled flight for the aircraft, thereby leading to flight delays and/or cancellations. These flight delays and/or cancellations are extremely costly to an airline, both in terms of actual dollars and in terms of passenger perception. In this regard, an airline typically begins accruing costs related to a flight delay following the first five minutes of a delay, with substantial costs accruing if the flight must be cancelled. Moreover, and as all air passengers are aware, airline dispatch reliability is a sensitive parameter that airlines often use to distinguish themselves from their competitors.

Notwithstanding the critical importance of properly performing unscheduled maintenance in both an accurate and timely manner, mechanics who perform the troubleshooting and unscheduled maintenance on the flight line face a daunting challenge. Aircraft are extremely large and complex systems comprised of many interconnected subsystems. Each subsystem is typically comprised of many LRUs (line replaceable units) that are designed to be individually replaced. An LRU may be mechanical, such as a valve or a pump; electrical, such as a switch or relay; or electronic, such as an autopilot or a flight management computer. Many LRUs are, in turn, interconnected. As such, the symptoms described by flight deck effects or other observations may indicate that more than one LRU can explain the presence of the observed symptoms. At that point, there is ambiguity about which LRU(s) have actually failed. Additional information will be needed to disambiguate between the possibilities. The above notwithstanding, ambiguous fault indications discovered during the troubleshooting process must nevertheless be resolved before the aircraft can be dispatched. Although such is not always the case, the ambiguous faults are ideally resolved within the cost functions, cost limits, airline schedule time constraints, airworthiness guidelines (e.g., "minimum equipment list" (MEL)), maintenance crew expertise at current location and at future destinations, part replacement costs, labor availability, repair equipment availability, part availability, size of next destination airport and its type of runway surface, etc.

Aircraft personnel must decide what tests and remedial actions to make when operational problems arise that threaten to delay an aircraft flight. These decisions must consider alternatives available and potential outcomes. Moreover, some maintenance actions cannot be deferred (e.g., actions in the airline's MEL guidelines), while other maintenance actions can be deferred (e.g., repair of components on the MEL list such as a coffee maker, a flight attendant call button, etc.). In short, aircraft preflight dispatch decision-making is a diagnostic process constrained by available alternatives and outcome values.

In an effort at least in part to assist aircraft personnel with troubleshooting and unscheduled maintenance, improved diagnostic systems and methods have been provided as is thoroughly described in the copending application titled "DIAGNOSTIC SYSTEM AND METHOD" of Kipersztok, et al., U.S. Pat. No. 6,574,537, filed Feb. 5, 2001, issued Jun. 3, 2003, which is commonly assigned with the present application. The entire contents of U.S. Pat. No. 6,574,537 is incorporated herein by reference in its entirety. The diagnostic systems and methods of U.S. Pat. No. 6,574,537 allow for reliable, time-efficient identification of failed components and provide information to enable aircraft personnel to make informed and efficient decisions regarding repair of suspect components or deferral of maintenance actions.

Although the diagnostic systems and methods of U.S. Pat. No. 6,574,537 have been successful for their intended purposes, it would also be highly desirable to provide a diagnostic system and method that determines the optimal maintenance action to take instead of aircraft personnel whose decisions might result in cost functions, cost limits, and time deadlines being exceeded during the aircraft preflight dispatch diagnostic process.

SUMMARY OF THE INVENTION

Accordingly, a need exists for a diagnostic system and method that enables multistage decision optimization in aircraft preflight dispatch and thus allows for a determination of the optimal maintenance action in accordance with the various variables associated with aircraft preflight dispatch, such as time deadlines, cost functions, cost limits, airworthiness guidelines, maintenance crew expertise at the aircraft's current and future destinations, part replacement costs, labor availability, repair equipment availability, part availability, size of next destination airport and its type of runway surface, etc. Ideally, the system would reduce the number of aircraft delays and cancellations and the number of unnecessary part repairs, removals, replacements, and testing, which in turn would thus significantly reduce airline maintenance costs.

In one preferred form, the present invention provides a diagnostic system that enables multistage decision optimization in aircraft preflight dispatch. The diagnostic system includes an interface for receiving at least one input relating to one or more observed symptoms indicative of a failed component in an aircraft. The diagnostic system extends an entropy-based value of information (VOI) diagnostic model by adding an explicit value function into the entropy-based VOI diagnostic model to accommodate various variables associated with the aircraft preflight dispatch problem. The variables may include, but are not limited to, decision parameters, utility functions, constraints, cost functions, cost limits, time deadlines, MEL guidelines, values, maintenance crew expertise at current location and future destinations, part replacement costs, labor availability, repair equipment availability, part availability, among other variables. The entropy-based VOI diagnostic model is constructed based upon at least one of systemic information relating to aircraft components and input-output relationships of the aircraft components, experience-based information relating to direct relationships between aircraft component failures and observed symptoms, and factual information relating to aircraft component reliability. Accordingly, the diagnostic system implements full VOI methodology using an influence diagram and thus allows for the performance of an optimized multistage decision process for aircraft preflight dispatch. During operation, the diagnostic system determines an optimal maintenance action for the aircraft in accordance with the extended VOI diagnostic model and the observed symptoms.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features throughout the drawings.

DETAILED DESCRIPTION OF THE PREFERRED EMBODIMENTS

Figure 1:
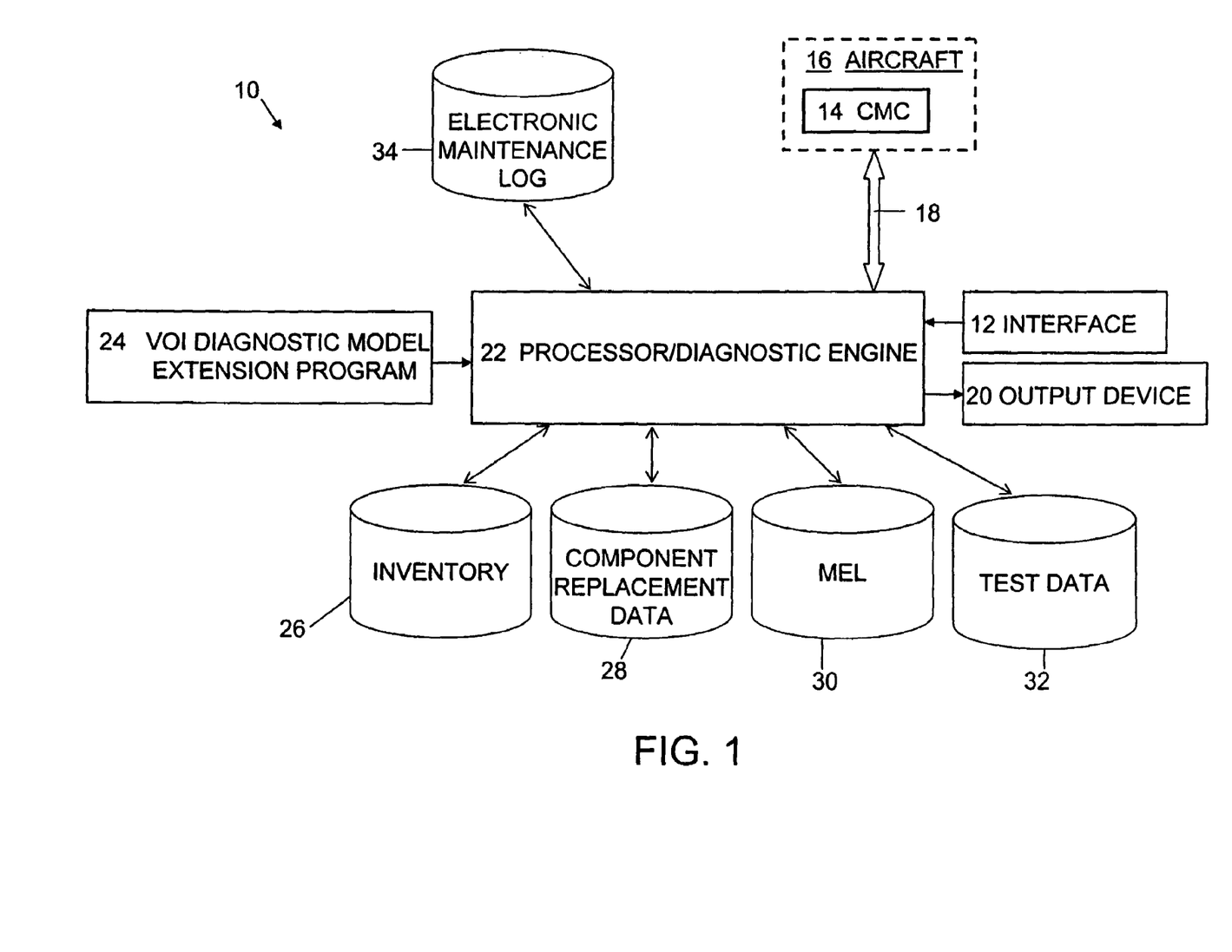
FIG. 1 is a block diagram of a diagnostic system according to one preferred embodiment of the present invention.

Referring to FIG. 1, there is shown a diagnostic system, generally indicated by reference number 10, according to one preferred embodiment of the present invention. Generally, the diagnostic system 10 enables multistage decision optimization for aircraft preflight dispatch by extending an entropy-based value of information (VOI) diagnostic model to meet the needs of the aircraft preflight dispatch problem. The extension adds an explicit value function into the entropy-based VOI diagnostic model to accommodate certain variables associated with aircraft preflight dispatch, such as time deadlines, cost functions, cost limits, airworthiness guidelines, maintenance crew expertise at current location and at future destinations, part replacement costs, labor availability, repair equipment availability, part availability, size of next destination airport and its type of runway surface, etc. Accordingly, the diagnostic system 10 implements full VOI methodology using an influence diagram (i.e., the extended VOI diagnostic model) and thus allows for the performance of an optimized multistage decision process for aircraft preflight dispatch.

During operation, the diagnostic system 10 determines the optimal maintenance action in accordance with the extended VOI diagnostic model and the observed symptoms indicative of a failed component. Having the diagnostic system 10 determine the optimal maintenance action instead of aircraft personnel (e.g., mechanic, etc.) eliminates, or at least substantially reduces, the risk of exceeding cost functions, cost limits, time deadlines, MEL guidelines, among other variables associated with the preflight dispatch problem.

As shown in FIG. 1, the diagnostic system 10 includes an interface 12 for receiving input from a user, such as a mechanic, flight, cabin or maintenance crew, etc. The diagnostic system 10 can include any interface known to those skilled in the art including a keyboard, a mouse, a track ball, a touch screen, a combination thereof, or the like.

In addition to receiving input via the interface 12, the diagnostic system 10 also allows for receipt of input directly from existing central maintenance computers (CMC) 14 on board aircraft 16, for example, via existing ATC data link capabilities and applications, among other methods (e.g., flight data recorders, etc.). As shown, the diagnostic system 10 may receive information from the aircraft 16 through a bi-directional data link 18.

In addition to receiving information via the link 18, the diagnostic system 10 can also uplink or send output directly to the CMC 14 of the aircraft 16. Accordingly, the diagnostic system 10 can provide maintenance decisions directly to the aircraft 16. This in turn can eliminate, or at least substantially reduce, the need for such decisions to be made by personnel on board the aircraft 16 when time is critical and the volume of information on which such decisions must be made and the speed at which the information is being received can both be overwhelming. In short, the diagnostic system 10 can provide accurate advice to the pilot as to the most appropriate and cost-effective action to be taken as opposed to ground personnel making these decisions.

By way of example only, the bi-directional data link 18 through which the aircraft 16 and diagnostic system 10 communicate may be compatible with the current industry standard ACARS (Aircraft Condition and Reporting System). However, it should be noted that the present invention is not limited to any particular data linking system. Alternatively, the diagnostic system may comprise an autonomous system that is embedded on board the aircraft.

The diagnostic system 10 also includes an output component 20 (e.g., graphical display, etc.) suitable for displaying or outputting information to aircraft personnel. Preferably, the output component 20 comprises a full sized display that offers high resolution, although the display can have other sizes and lower resolutions in order to reduce the cost of the diagnostic system 10 and/or to increase the portability of the diagnostic system 10, especially in those applications in which the diagnostic system 10 is implemented in a handheld computing device.

The diagnostic system 10 further includes a suitable processing element 22 for performing the various operations required by the diagnostic technique of the present invention. The processing element 22 is typically comprised of a combination of hardware (e.g., one or more microprocessors, other processing devices) and software that is stored by memory and executed by the hardware. In the illustrated embodiment, the processor 22 executes a VOI diagnostic model extension program or software module 24 during operation of the diagnostic system 10. However, it should be understood that the processing element 22 can be comprised of other combinations of hardware, software, firmware or the like that are capable of extending an existing entropy-based VOI diagnostic model and applying the resulting extended or full VOI diagnostic model to resolve the aircraft preflight dispatch problem while accommodating the various preflight dispatch variables, such as decision parameters, utility functions, cost functions, cost limits, time deadlines (e.g., aircraft departure time, part repair deadline setting maximum time allowed for part repair deferral), MEL guidelines, maintenance crew expertise at current location and at future destinations, part replacement costs, labor availability, repair equipment availability, part availability, size of next destination airport and its type of runway surface, etc.

The diagnostic system 10 also includes memory which may take the form of any suitable computer readable storage device. For example, the memory may comprise read only memory (ROM), random access memory (RAM), video memory (VRAM), hard disk, floppy diskette, compact disc (CD), an optical disk, magnetic tape, a combination thereof, etc. The memory may comprise computer readable media for storing such items as program code, software packages, programs, algorithms, information, data, files, databases (e.g., 26 through 34, described below), applications, among other things.

In the embodiment shown in FIG. 1, the diagnostic system includes the VOI diagnostic model extension program or software module 24 that is executable by the processing element 22. The VOI diagnostic model extension program 24 may be embodied in computer-readable program code stored in one or more computer-readable storage media operatively associated with the diagnostic system 10. Regardless of where it resides, however, the VOI diagnostic model extension module 24 comprises program code for extending an entropy-based VOI diagnostic model and determining the optimal maintenance action in accordance with the extended VOI diagnostic model.

It is to be understood that the computer readable program code described herein can be conventionally programmed using any of a wide range of suitable computer readable programming languages that are now known in the art or that may be developed in the future. It is also to be understood that the computer readable program code described herein can include one or more functions, routines, subfunctions, and subroutines, and need not be combined in a single package but may instead be embodied in separate components. In addition, the computer readable program code may be a stand-alone application, or may be a plug-in module for an existing application and/or operating system. Alternatively, the computer readable program code may be integrated into an application or operating system. In yet another embodiment, the computer readable program code may reside at one or more network devices (not shown), such as an administrator terminal, a server, etc.

Although the present invention is described with the VOI diagnostic model extension program 24 having a direct effect on and direct control of the diagnostic system 10, it should be understood that it is the instructions generated by the execution of the program 24 by the processing element 22, and the subsequent implementation of such instructions by the processing element 22, that have direct effect on and direct control of the diagnostic system 10.

It should also be noted that the diagnostic system 10 may be supported and implemented in a portable computing device as a stand alone application without having to be networked. In such embodiments, the portable computing device is preferably a personal computer (PC), such as a laptop PC or some other specialized type of PC. While not portable, a desktop PC could also serve as a stand alone computing device. Alternatively, the portable computing device may be designed to support the diagnostic system 10 in a networked environment in which at least a portion of the diagnostic system 10 is supported by a server or other network device. In this instance, the remote computing device can be a miniature computer such as a pocket PC, a personal data assistant (PDA) such as a Palm device, or some other type of hand held computer. With the rapid advances in computing technology, however, these miniature computers may spoon be capable of supporting the diagnostic system 10 in a stand alone manner and additional computing devices may be developed that are also capable of supporting the diagnostic system 10. Thus, the diagnostic system 10 of the present invention is not limited by the type of computing device which serves as the host.

The diagnostic system 10 is designed to receive input relating to various observed symptoms that indicate a problem onboard the aircraft 16 that is generally caused by a failed component, such as a failed line replaceable unit (LRU) or a lower level component within an LRU. The relationship between the observed symptoms and the failed component is often far from clear.

The input relating to the observed symptoms is generally received via the interface 12 and/or link 18. Typically, the observed symptoms are provided by the flight and cabin crew and are recorded in pilot log books, crew reports or the like. These observed symptoms can come in many forms including flight deck effects and other observations. Flight deck effects include indications provided by various gauges, indicator lights and the like. The observations can include various types of environmental or other information including suspect sounds, vibrations, smells or visual cues observed by the flight, cabin or maintenance crew. Further, the observed symptoms can include the results of tests and/or information provided by the CMC 14 (e.g., messaging information from the aircraft's central maintenance computer function (CMCF), sensor and real-time information from aircraft condition monitoring function (ACMF)), sensors or other equipment on board the aircraft 16 via a bidirectional data link 18.

In the preferred embodiment, the diagnostic system 10 correlates the observed symptoms with one or more suspect components according to a diagnostic model, which is ultimately embedded into an extended decision-theoretic framework with variables (e.g., but not limited to, decision parameters, utility functions, condition-action constraints, deterministic constraints, cost functions, cost limits, time deadlines, MEL guidelines, values, maintenance crew expertise at current location and at future destinations, part replacement costs, labor availability, repair equipment availability, part availability, etc.) in the manner more fully described below. The diagnostic model is preferably constructed based upon systemic information, experience-based information as well as factual information. The systemic information is typically related to the system components and the input-output relations of the system components. The systemic information may be obtained in various manners, but is typically gathered through interviews with system engineers or the like for the aircraft manufacturer who have significant experience in the design and development of the aircraft and its attendant systems and the relationship of the various subsystems. The experience-based information defines the direct relationships between component failures and the observed symptoms. While the experience-based information can also come from various sources, it is typically provided by experienced mechanics or engineers who have extensive experience troubleshooting a particular model of aircraft and have a wealth of knowledge relating to the typical types of failures and the symptoms exhibited by an specific model aircraft, including those particularly troubling faults that are multiple, intermittent, repeating or cross-system in nature. As such, the experience-based information includes knowledge that has been gained by an individual after months or years of experience with a given type of aircraft.

Finally, the factual information mentioned above relates to component reliability. Typically, the factual information is statistical data of component reliability as well as related textual data from historical maintenance records. As such, the factual information provides the statistical data necessary to determine the probability of each failure state of each component of an aircraft.

Based upon these various types of information, a number of different diagnostic models or networks can be constructed by the diagnostic system 10 to correlate the observed symptoms with one or more suspect components. For example, the diagnostic system 10 may construct a diagnostic model utilizing model-based or case-based reasoning, Bayesian networks, neural networks, fuzzy logic, expert systems or the like. Because Bayesian networks can accept reliability data as well as information from other sources, such as systemic information and experience-based information, and can compute posterior probabilities for prioritizing suspect components, the extended VOI diagnostic model is preferably constructed based upon a Bayesian network that is capable of being updated. See, for example, S. L. Lauritzen et al., *Local Computations With Probabilities on Graphical Structures and Their Applications to Expert Systems*, Journal of the Royal Statistical Society B, Vol. 50, pp. 157–224 (1988), incorporated herein by reference, for a more detailed discussion of the Bayesian probability update algorithm.

While any of a wide range of known model building approaches may be used to build the initial Bayesian network upon which both the construction of the entropy-based VOI diagnostic model and thus also the extended VOI diagnostic model are based, several model building approaches for Bayesian networks are described by M. Henrion, *Practical Issues in Constructing a Bayes' Belief Network, Uncertainty in Artificial Intelligence*, Vol. 3, pp. 132–139 (1988), incorporated herein by reference, and H. Wang et al., *User Interface Tools for Navigation in Conditional Probability Tables and Graphical Elicitation of Probabilities in Bayesian Networks*, Proceedings of the Sixteenth Annual Conference on Uncertainty and Artificial Intelligence (2000), also incorporated herein by reference. A number of software packages are also commercially available for building models of a Bayesian network. These commercially available software packages include Dxpress®) expert system creation computer software from Knowledge Industries® Inc., Netica®) articificial intelligence computer software from Norsys Software Corporation of Vancouver, British Columbia, and Hugin from Hugin Expert A/S of Denmark. As provided by these commercially available software packages, the VOI diagnostic model extension program 24 preferably includes a software package for building the initial Bayesian network upon which the construction of the extended VOI diagnostic model is based.

Regardless of the model building tool or approach that is used, the general approach to constructing a Bayesian network is to map the causes of failure to the observed symptoms, as opposed to the normal behavior of the system. The construction of a Bayesian network and the enhancement thereof into an entropy-based VOI diagnostic model for aircraft troubleshooting and diagnosis is thoroughly described in the copending application titled "DIAGNOSTIC SYSTEM AND METHOD" of Kipersztok, et al., U.S. Pat. No. 6,574,537, the entire contents of which is incorporated herein by reference in its entirety.

A brief description of an exemplary process that may be used for constructing a Bayesian network for aircraft diagnosis will be given in order to provide a foundation for an even better understanding of the use and operation of various implementations of the present invention. The construction of a Bayesian network requires the creation of nodes with collectively exhaustive, mutually exclusive discrete states, and influence arcs connecting the nodes in instances in which a relationship exists between the nodes, such as in instances in which the state of a first node, i.e., the parent node, effects the state of a second node, i.e., the child node. In a Bayesian network, a probability is associated with each state of a child node, that is, a node that is dependent upon another node. In this regard, the probability of each state of a child node is conditioned upon the respective probability associated with each state of each parent node that relates to the child node.

The nodes of a Bayesian network include both probablistic and deterministic nodes representative of the components, observed symptoms and tests. Typically, the nodes representative of the components and the nodes representative of the observed symptoms are interconnected through one or more intermediate nodes via influence arcs. Component nodes have no predecessors or parents influencing them. Test and observation nodes have no successors or children to influence. A Bayesian network also includes a number of intermediate nodes interconnecting the nodes for the components and the nodes for the observed symptoms. The intermediate nodes represent the failure state of a switch, valve, duct or the like. Based upon the failure state of a component, the intermediate nodes may interconnect the node(s) representing one or more components with the node(s) representing one or more of the observed symptoms in an acyclic manner.

Each node of a Bayesian network has a list of collectively exhaustive, mutually exclusive states. If the states are normally continuous, they must be discretized before being implemented in the network. For example, every component node has at least two states, (i.e., normal and failed). The other nodes, however, can include states that are defined by some experience-based information. A probability is assigned to each state of each node. The probability is typically based upon the factual information, but may also be partially based upon systemic and/or experience-based information. For a node representing a component, the probability that is assigned to the failed state is obtained from the reliability and maintainability data and/or experential data. For example, a certain LRU may have a failure probability of 0.00003, which is derived using appropriate probability models from observed meantime between failures. The other nodes, such as the intermediate nodes, contain conditional probability tables mostly derived from experience-based information, with distributions specified over the states of the child nodes conditioned over the states of the parent nodes.

Based upon one or more observed symptoms, the diagnostic system 10 implementing a Bayesian network can identify one or more suspect components, such as LRUs or lower level components within an LRU, that may have failed and caused the observed symptom(s). In addition, the diagnostic system 10 implementing a Bayesian network can identify the probability that each suspect component failed and caused the observed symptoms based upon the probability of failure of the node representing the suspect component and the probabilities associated with the respective states of the intermediate nodes that lead to the node representing the observed symptom. Accordingly, the diagnostic system 10 can create a prioritized listing of the suspect components based upon the respective probabilities of failure of the suspect components.

The diagnostic system 10 implementing a Bayesian network can further identify one or more tests that may be conducted in order to refine the identification of the suspect components and the relative probability that each suspect component caused the problem with the aircraft. In this regard, the Bayesian network includes nodes representative of tests to be conducted to determine the state of one or more other nodes such that the links between the nodes for the suspect components and the nodes for the observed symptoms can be refined based on the outcome of the test(s). Accordingly, the Bayesian network implemented by the diagnostic system 10 can identify those tests related to any of the nodes in the path from the suspect components to the observed symptoms or tests that could be conducted to refine the identification and prioritization of the suspect components. Assuming that one or more of the tests are preformed and the results or outcome of the tests are entered into the diagnostic system 10, the diagnostic system 10 again determines the suspect components capable of causing the observed symptoms upon failure and their relative probability of failure based upon the outcome of the test(s) and then creates a reprioritized listing of the suspect components.

To sum up, a Bayesian network can be used by the diagnostic system 10 to correlate the observed symptoms with one or more suspect components, to identify and create a prioritized listing of the suspect components based upon the respective probabilities of failure of the suspect components, and to identify and create a prioritized listing of the tests that could be conducted to refine the identification and prioritization of the suspect components. Although the prioritized listings readily allow capable aircraft personnel to determine appropriate maintenance actions for the aircraft, there is nevertheless the risk that the performance of the maintenance actions as determined by the aircraft personnel will exceed one or more of the preflight dispatch variables such as cost functions, cost limits and time deadlines. To eliminate, or at least substantially reduce, this risk, the diagnostic system 10 determines the optimal maintenance action instead of the aircraft personnel. To do so, the diagnostic system 10 extends an existing entropy-based VOI diagnostic model in a way that accounts specifically for the variables associated with aircraft preflight dispatch problem. Accordingly, the diagnostic system 10 implements full VOI methodology using an influence diagram (i.e., the extended VOI diagnostic model, see FIG. 2) and thus allows for the performance of an optimized multistage decision process for aircraft preflight dispatch.

The extension added to the Bayesian network distinguishes between faults that can be deferred and faults that cannot be (e.g., faults listed in the MEL). The value function addresses the variety of responses and decision parameters (e.g., inspect, repair, replace, defer, delay, cancel, cancel and replace aircraft) made at the airport gate and the various direct and indirect costs that characterize them.

The values added to the Bayesian network are functions of the response action outcomes. The values are determined by the cost for the combination of each outcome and response action. The diagnostic system 10 ultimately makes dispatch decisions by maximizing the expected values of response action outcomes.

Figure 4:
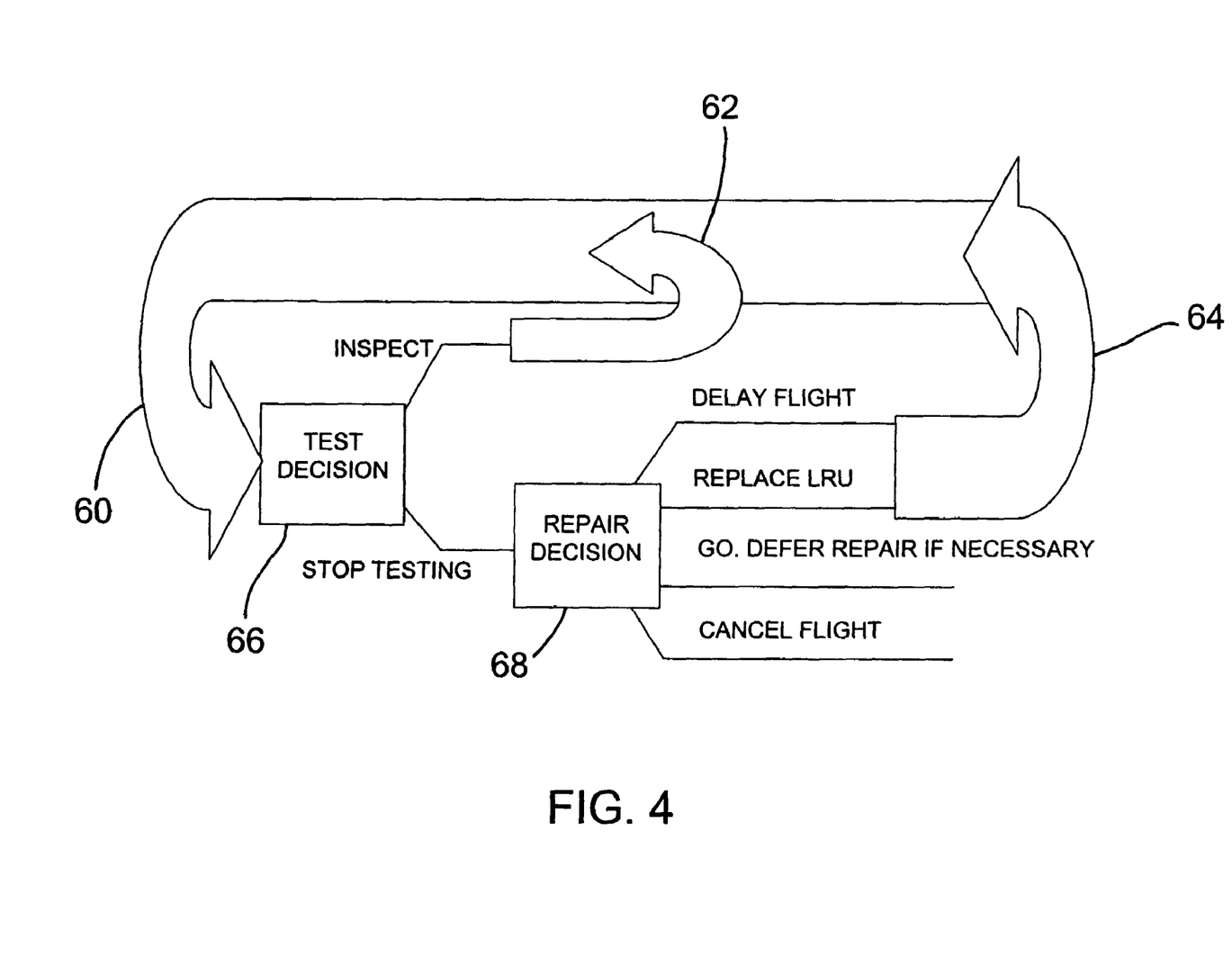
FIG. 4 illustrates alternative maintenance actions at each preflight dispatch decision point.

Referring now to FIG. 4, the process implemented by the diagnostic system 10 includes an "inner cycle" for testing (represented by arrows 60 and 62) and an "outer cycle" for troubleshooting (represented by arrows 60 and 64). Breaking the sequence into an inner test cycle and an outer remediation cycle allows for formulation and resolution of the aircraft dispatch decision problem with the advantages of value of information (VOI) driven test sequences.

A typical VOI computation implies a simple stopping rule for the inner test cycle: run tests as long as there remains a test with a positive net VOI. If no tests have a positive net VOI, the inspection and test alternatives have been exhausted for the inner test cycle and the outer remedial decision is addressed. However, because the aircraft preflight dispatch problem involves cost constraints and time deadlines, the stopping rule becomes more complicated in that conventional myopic methods risk exceeding such cost constraints and time deadlines. Accordingly, the expected cost to complete troubleshooting is predicted so that a comparison can be made with the cost of delay or cancellation. Thus, the diagnostic process involves running the inner test cycle myopically with regard to the ordering of tests but preempting the inner test cycle and addressing the repair decision 68 if the estimate of the sum of costs and time delays for the inner cycle exceed those prescribed for the dispatch of the particular aircraft 16.

In practice, a component replacement decision may have a value as a test, implying that the replacement must be analyzed as a sequence of both inspection and replacement actions. Accordingly, the diagnostic system 10 recalculates VOI at each initiation of a new test phase.

Although formulating basic VOI diagnostic models is known in the art, a brief description of the process will be given in order to provide a more understandable basis for understanding the extended VOI diagnostic model of the present invention. VOI is defined as the difference between the expected value v* of a decision with a test's information (EVWI) and the expected value $v_{notest}$ with no information. This can be done by solving the VOI model twice, once assuming the test information will be known when the repair decision is made and once assuming it won't (equivalent in the influence diagram 36 shown in FIG. 2 to removing the arc 48 interconnecting the observation variable 42 to the repair variable 40).

Figure 2:
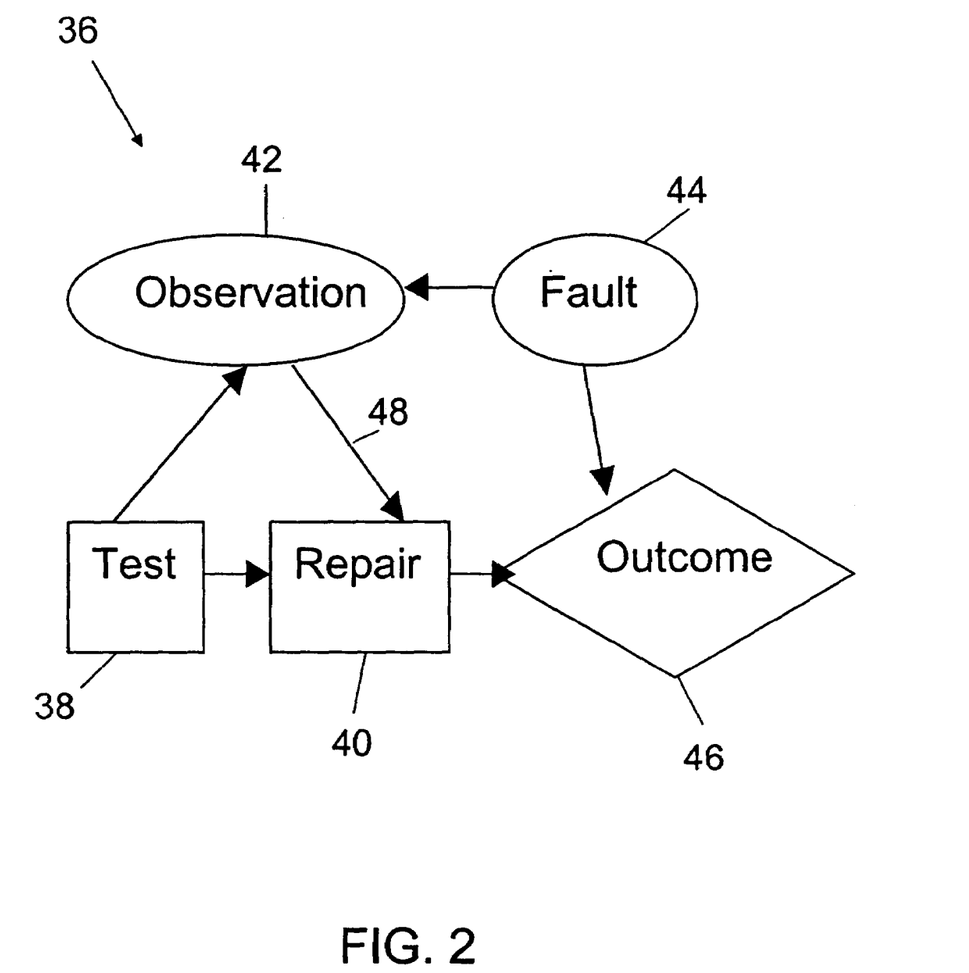
FIG. 2 is an influence diagram of an exemplary value of information (VOI) diagnostic problem.

With further reference to FIG. 2, a VOI diagnostic problem, when shown as an influence diagram 36, minimally includes a sequence of a test and repair decisions 38 and 40, together with an observation variable 42, a fault variable 44, and an outcome variable 46. The decision variables are shown by rectangles, and uncertain or stochastic variables are shown by ovals. Accordingly, the entire previously described Bayesian network is represented and summarized by two nodes, i.e., the node 42 representing the set of observations variables and the node 44 representing the set of all fault variables. In addition, the repair decision 40 affects the outcomes and hence the cost. The cost is also a function of the fault state 44. The test decision 38 affects the information available at the time the repair decision 40 is made.

The solution to the expected value of the decision problem represented by the influence diagram 36 is the following Equation (1):

$$v^* = \max_t E_F[\max_{d(Q)} E_{Q|F}[v(t, d(Q), F)]] \quad (1)$$

In Equation (1):
the random variable F represents the presence or absence of the component fault;
the random variable Q represents the observation state;
the function d(Q) represents the repair decision policy;
E represents the Expected Value;
d represents the repair decision;
t represents the test decision; and
v(t,d,F) is the value function over outcomes.

Note that if each variable argument, i.e., t, d and F, has two values, then eight values are needed for v's table.

The derivation of the method for solving Equation (1) and reduction of an influence diagram is described by R. Shacht, *Evaluating Influence Diagrams*, Operations Research, Vol. 33, No. 6, pp. 871–882 (1986). The step by step solution of Equation (1) and reduction of the influence diagram 36 will also be briefly described herein.

The first step in solving Equation (1) is computing the posterior probability p{F|Q} of the faulty component given the possible observations with Bayes' rule transforming Equation (1) to:

$$v^* = \max_t E_q[\max_d E_{f|q}[v(t, d, f)]] \quad (2)$$

Once Bayes' rule has been applied, the variables in the influence diagram 36 can be removed into the value node in the following order: Fault, Repair, Observation, then Test. Removing Fault, Repair, and Observation from the influence diagram 36 yields the following Equation (3):

$$v^* = \max_t \bar{v}^*(t) \quad (3)$$

In Equation (3), $\bar{v}^*$ is the average v*. Equation (3) yields the value as a function of the test variable, or the value with information.

For VOI, however, we need the difference between this and the value $V_{notest}$ without information:

$$VOI = \max_t \bar{v}^*(t) - \bar{v}^*(t = \text{"notest"}) \quad (4)$$

The value under t="no test" can be calculated more simply without involving the observation node:

$$v_{notest} = E_f[\max_d v(t = \text{"notest"}, d, f)] \quad (5)$$

Thus, $VOI = \max_t \bar{v}^*(t) - v_{notest}$ \quad (6)

Equation 6 makes it clear that if the best choice of t="notest", then VOI=0.

Figure 3:
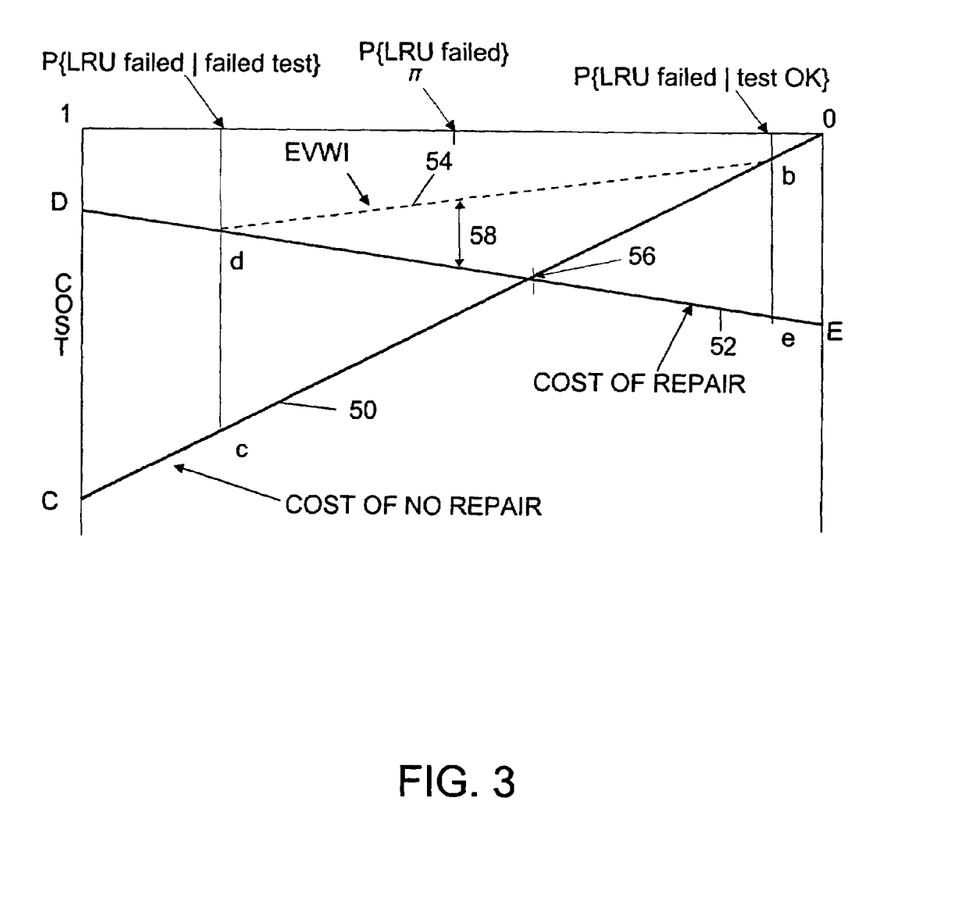
FIG. 3 is a VOI graph plotting repair alternatives as a function of component fault probability in the case of a single repair decision.

Referring now to FIG. 3, there is shown a graph illustrating the properties of VOI. The graph plots the expected cost of repair alternatives as a function of the probability of the fault to repair in the case of a single repair decision. Each repair action ("repair action" and "no repair action") is plotted as a line 50 and 52 connecting the cost incurred in the case that the LRU fails or if it does not. The convex hull formed by the two lines is spanned by the EVWI (expected value with information) line 54 that corresponds to a test. In addition, $\pi$ is the value of information when the LRU has failed. The "COST" axis is somewhat counterintuitive in that costs increase preceding along the negative Y-axis (e.g., "C" is a greater cost than "D").

There are four outcomes to consider, which are the combinations of "repair" or "no-repair" in combination with "LRU fails" and "LRU doesn't fail." Costs are normalized so cost is zero when the LRU does not fail and no repair is taken. The components comprising the other costs and which are shown in FIG. 3 are as follows:

C represents the cost of failure. If the component is critical, maintenance cannot be deferred per the MEL and cost could be catastrophic. If component failure would not necessarily lead to system failure, then C is the expected loss when operating with the failed component. In this model, C is the largest cost that could be incurred.

D represents the complete cost of making the repair, including the cost of the part and replacement, assuming the repair successfully remedies the failed LRU and there are no further costs as a consequence of the LRU failure.

E represents the complete cost of making an unnecessary repair, when the part has failed. It exceeds D by additional expected loss due to technician-induced failure and costs due to "no fault found." Costs D and E may be equal. However, in E the failure has not occurred, so any indirect cost of returning the part when no fault has been found must be added.

It should be noted that FIG. 3 does not show the cost of the test information. Test costs would appear as an amount subtracted from the VOI, independent of outcome state.

The expected cost of a repair action is a linear function of the fault probability as can be seen by writing out the term E[v(d,f)] for each repair decision, as a function of the component fault probability, $\pi$.

$$V(\pi, d=\text{repair}) = D\pi + E(1-\pi) \quad (7)$$

$$V(\pi, d=\text{norepair}) = C\pi + 0(1-\pi) \quad (8)$$

Equations (7) and (8) above correspond to the line 52 from D-E and line 50 from C-0, respectively. The alternative chosen as a function $\pi$ will correspond to the function that has a higher value. The two alternative functions cross at the repair threshold 56 in FIG. 3 and the following Equation (9):

$$r = E/(C - D + E) \quad (9)$$

When the inferred probability of LRU failure is greater than the repair threshold 56 (i.e., to the left of the repair threshold 56), the optimal choice is to repair. Conversely, when the inferred probability of LRU failure is less than the repair threshold 56 (i.e., to the right of the repair threshold 56 in FIG. 3), the optimal choice is to forgo repair.

To consider the effect of information, imagine an additional linear function d-b called the "expected value with information" (EVWI) (shown as dashed line 54 in FIG. 3) connecting the points where the two possible states of evidence intersect the lines 50 and 52. The two possible evidence points indicate the best action based on the evidence received. The value of the information as a function of the prior π (the term under the max, operator in equations (1) and (2)) lies along the EVWI line 54. We are interested in the value at the point π, representing the uncertainty when VOI is calculated. VOI is the difference (referenced by 58 in FIG. 3) between the EVWI function and the uppermost repair action at the point π.

The VOI is the net cost of generating the information (e.g., the materials and time costs of running the test). The "cost of information" (COI) is cost incurred when the test is chosen, and is independent of the outcome variable 46. Irrespective of the state of the part, the cost COI is the same, i.e., COI is not a random variable. Subtracting COI from VOI as shown in Equation (6), the VOI net of the test cost becomes:

$$VOI_{net} = \max_t[\bar{v}^*(t) - v_{notest} - COI(t)] \qquad (10)$$

The extension and application of a conventional VOI diagnostic model to the aircraft preflight dispatch problem will now be described in detail. To extend and apply a VOI diagnostic model to the aircraft preflight dispatch problem, a determination must first be made as to the relevant actions and costs and how they correspond to the VOI model.

As shown in FIG. 4, the extended VOI diagnostic model includes two decisions, i.e., the test decision 66 and the repair decision 68. As shown, the extended VOI diagnostic model is applied successively and the two decisions become a series of interleaved test and remediation decisions. As in the conventional VOI model, the test decision 66 precedes the repair decision 68 in a preflight situation. The test cycle alternatives are:

Inspect with another diagnostic test, incurring the time and cost of the test; and Stop testing and choose a repair action.

The repair decision 68 includes several remedial alternatives, one of which is repair. All alternatives not part of the test decision 66 are combined or grouped together with repair, which are as follows:

To proceed with the flight as scheduled ("go");

To replace a suspect failed LRU;

To defer the LRU repair or replacement if not in the MEL list;

To delay the flight with the expectation the diagnosis and repair can be completed; and To cancel the flight or replace the aircraft.

The test decision 66 can be reconsidered if the original failure was not resolved by the component replacement and the time deadlines and cost constraints have not been exceeded, as shown by the return arrow 64.

Several factors make the extended VOI diagnostic model, as applied to aircraft preflight dispatch decision-making, more complex than the conventional, two decision—two alternative VOI diagnostic model. First, preflight dispatch decisions must be made under cost constraints, time deadlines and within MEL guidelines. Second, the remedial action is addressed if no test remains with positive net VOI such that remedial action replaces the single "repair" decision of the conventional VOI model. Third, the remedial action is not necessarily the final decision. If the repair is not final, the process can be repeated (as shown by return arrow 64) if cost constraints and time deadlines have not been exceeded.

Despite its complexity, the extended VOI diagnostic model for aircraft preflight dispatch problems can be simplified by a plurality of constraints (e.g., condition-action or deterministic constraints), which are listed below. More specifically, the choice among remediation alternatives can be significantly reduced by a set of constraints derived from or associated with the characteristics of the preflight dispatch process, and sometimes may determine the solution without further computation. For example, only some remedial actions are possible at any time. Moreover, remedial actions are constrained by time and resource availability, and the severity of the likely faults.

The diagnostic system 10 includes one or more databases that contain the constraints, data relating to the suspect components, and/or other data relating to the aircraft preflight dispatch problem, as shown in FIG. 1. The processing element 22 can link to the one or more databases either directly or remotely via a network with which the diagnostic system 10 is in communication. Preferably, the diagnostic system 10 includes the database 26 that maintains a listing of the inventory available, the database 28 containing data relating to the time and costs for repairing or replacing various suspect components, the database 30 having the "Minimum Equipment List" (MEL), and the database 32 containing data relating to the time, costs, and description of various tests. In addition, the diagnostic system 10 may further include data relating to costs of a bringing a particular part that is missing from another location, data relating to the next destination of the aircraft, data relating to the level of expertise of the onsite maintenance crew, data relating to the level expertise of the maintenance crew at the aircraft's next destination, among other data.

An important factor that influences aircraft component repair under time deadlines is whether the faulty component is on the "Minimum Equipment List" (MEL), which is contained within database 30. An MEL is generally maintained for each model of aircraft and indicates which critical components must be functioning properly for the aircraft to be cleared for takeoff. An aircraft can be cleared for takeoff if the failed component is not on the MEL list, such as a flight attendant call button or a coffee maker. Determining that a faulty component is not critical is "to MEL" the component. The MEL list is written in terms of functionality so that whether a failure can be "MEL-ed" can depend on conditions such as weather or the duration of the flight. The MEL decision is in effect the decision to defer maintenance such that it is not necessary to complete the repair within the preflight deadline. In short, component replacement can be deferred if the component does not appear on the MEL.

The effect of the MEL decision on the VOI graph (FIG. 3) is to decrease the severity of the cost C such that it is less than the costs of repair D. In that case, the "no repair" action dominates for any level of p{LRUfailed}. Further, inspect and repair actions might be taken if time allows but such are not required.

The "LRU replace" alternative must be considered if the repair cannot be deferred. Data pertaining to the costs and time related to component replacement or repair is contained in database 28 (FIG. 1). The costs of replacement are both the direct costs of the replacement part and the indirect costs of possible "technician induced failure" (TIF) and the time cost of exceeding the flight deadline. The latter depends on whether a replacement part is available or not, which may be determined by accessing inventory database 26. In terms of the VOI graph (FIG. 3), the effect of all these costs is to shift the "repair" alternative up or down by changing costs D and E uniformly. The effect of this for a constant "no repair" alternative is to increase the repair threshold probability as costs D and E increase.

Delay and Cancel alternatives can also be expressed as functions on the VOI graph, for purposes of determining the remediation action. Flight cancellation cost is independent of fault probabilities for the aircraft under repair. Thus, the action line appears as a horizontal line, i.e., for this action D=E. Cancellation costs are typically high in terms of reputation and passenger inconvenience, and as a result, the cancellation action function will typically sit well below other alternatives. It will become relevant if either all repair and delay actions have been exhausted, or an alternative aircraft is available at low cost, such as an aircraft set aside as a "hot runway spare." The cancellation cost associated with the substitute aircraft is the opportunity cost of not having the spare available for a subsequent cancellation.

The delay alternative incurs costs much like the cancellation alternative, but with the hope of finding a repair alternative given the extended deadline. In a strict sense, the delay alternative is not a simple alternative, but the composite of alternatives and choices that would be made in the time available.

The extended VOI diagnostic model policies imposed on the preflight dispatch decision space are summarized in the Table below. As shown, the Table illustrates the actions that might be expected under various combinations of the condition-action constraints listed therein. The first column of the Table lists the available actions under the conditions listed in its row, and the four last columns contain conditions in terms of time and resources. The following conditions that constrain remedial actions are defined as follows:

"Component replacement is mandatory or non-MEL-able" means the aircraft cannot depart without fixing or deferring ("MEL-ed") the problem (MEL-ed=1);

"Component replacement not possible" means that time and/or cost functions, cost limits were exceeded for part replacement (Replace=0);

"Replacement part not available" means the part cannot be acquired within time and/or cost functions, cost limits (Available=0); and "Component inspection not possible" means that the time or resources needed for testing have run out even though inspection may reveal the part does not have to be replaced (Inspect=0).

| ACTION | CONDITION CONSTRAINT | | | |
|---|---|---|---|---|
| | MEL-ed | Inspect | Replace | Available |
| Delay or Cancel | 0 | 0 | 0 | 0 |
| Delay | 0 | 0 | 0 | 1 |
| Delay or Cancel | 0 | 0 | 1 | 0 |
| Replace | 0 | 0 | 1 | 1 |
| Inspect | 0 | 1 | 0 | 0 |
| Inspect, Delay or Cancel? | 0 | 1 | 0 | 1 |
| Delay & Inspect | 0 | 1 | 1 | 0 |
| Fix | 0 | 1 | 1 | 1 |
| Go | 1 | 0 | 0 | 0 |
| Go (& plan maintenance) | 1 | 0 | 0 | 1 |
| Go (& plan maintenance) | 1 | 0 | 1 | 0 |
| Fix & Go | 1 | 0 | 1 | 1 |
| Go & test if necessary | 1 | 1 | 0 | 0 |
| Go (& plan maintenance) | 1 | 1 | 0 | 1 |
| Inspect | 1 | 1 | 1 | 0 |
| Fix & Go (perhaps Inspect) | 1 | 1 | 1 | 1 |

As apparent from the first row of the Table, the only alternative is delay or cancel the flight when each of the four condition constraints are zero. When the repair can be deferred or MEL-ed, the aircraft can be dispatched on schedule, and the actions taken will be determined by the convenience of repairing versus postponing repairs. Part unavailability precludes replacement even within time constraints. A flight is delayed or cancelled if the departure deadline is exceeded, and a component that cannot be MEL-ed has to be inspected or replaced. To avoid delay or cancellation, a component that cannot be MEL-ed must be replaced before the departure deadline is exceeded if the part is available. Faults will be inspected when tests return positive VOIs, unless time deadlines, cost functions, and/or cost limits preclude the tests.

The decision table and the constraints shown therein are predicated on the probability of identifying suspected faulty components above their repair threshold. The operative row of the decision table depends on which component has been singled out to be MEL-ed, inspected, or replaced. The behavior of the model may change dynamically as fault probabilities change due to the performance and outcomes of tests and inspections. For example, a non-MEL-able situation could become MEL-able or vice versa, as inspections implicate alternate underlying faults.

In preflight troubleshooting, there are cost functions, cost limits, and time deadlines. The diagnostic-repair session should come to an end if it is predicted that any of these will be exceeded before the session is complete. They may each be considered as different cost dimensions. The cost threshold is the point where direct costs of the repair exceed what it would cost to just replace the equipment under repair. The time threshold is the point where the expected direct costs of repair would exceed the cost of delaying or canceling the flight.

Expected cost and time required by each action are predicted for the sequence of actions. If the planned sequence of actions exceeds the cost or time deadline, then the flight should be cancelled. To consider the effects of delay, the indirect costs of delay as a function of time can be added to the direct costs of the actions. Thus, the total cost is the sum of the costs of observations and repairs and an exogenous cost of delay that expresses the costs incurred if no repair actions are taken as a function of time. These exogenous costs are the indirect cost of loss of reputation, contingent delays, among others.

Figure 5A:
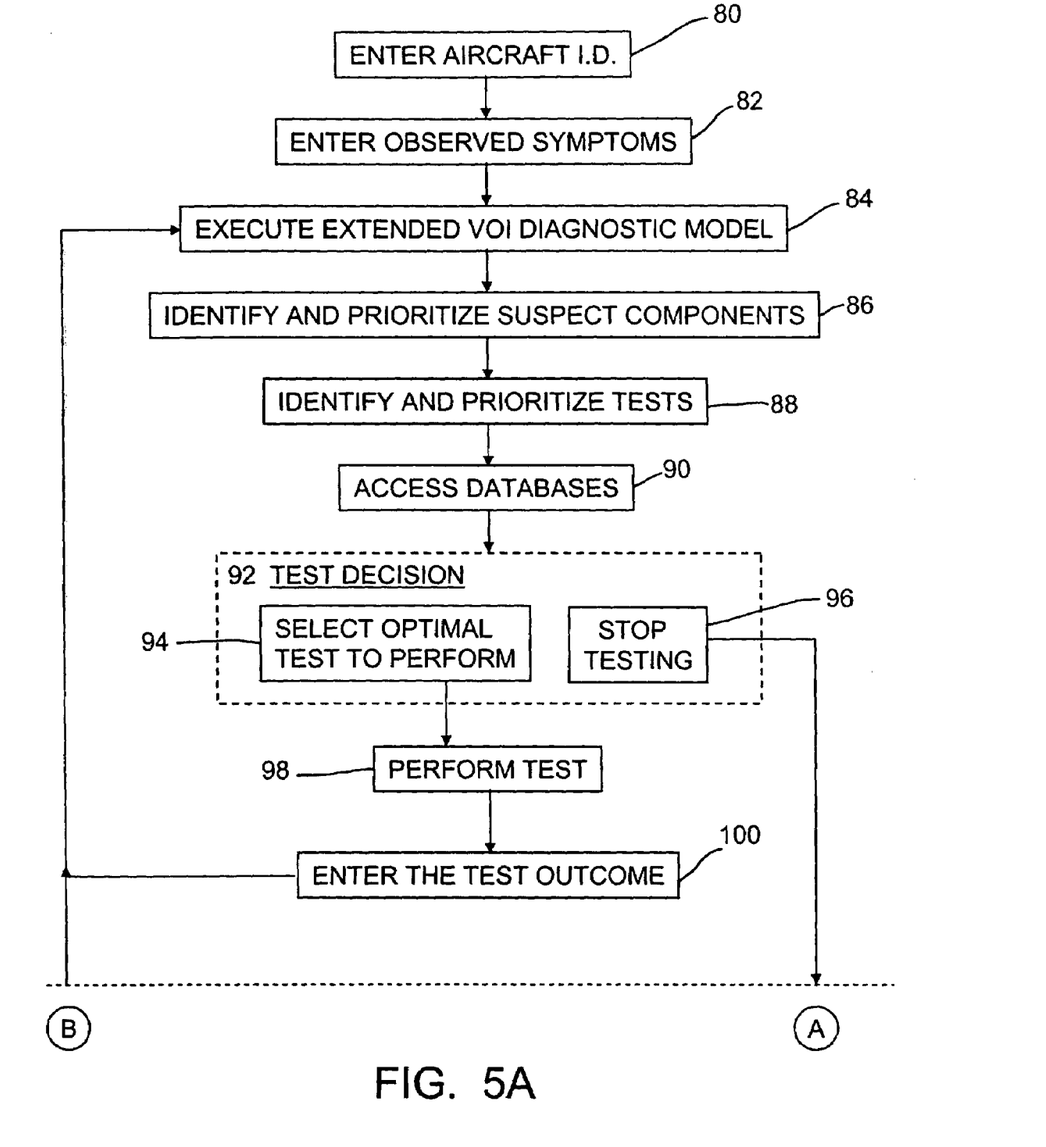
FIGS. 5A and 5B form a flowchart illustrating the operations of a method performed by the diagnostic system shown in FIG. 1.
Figure 5B:
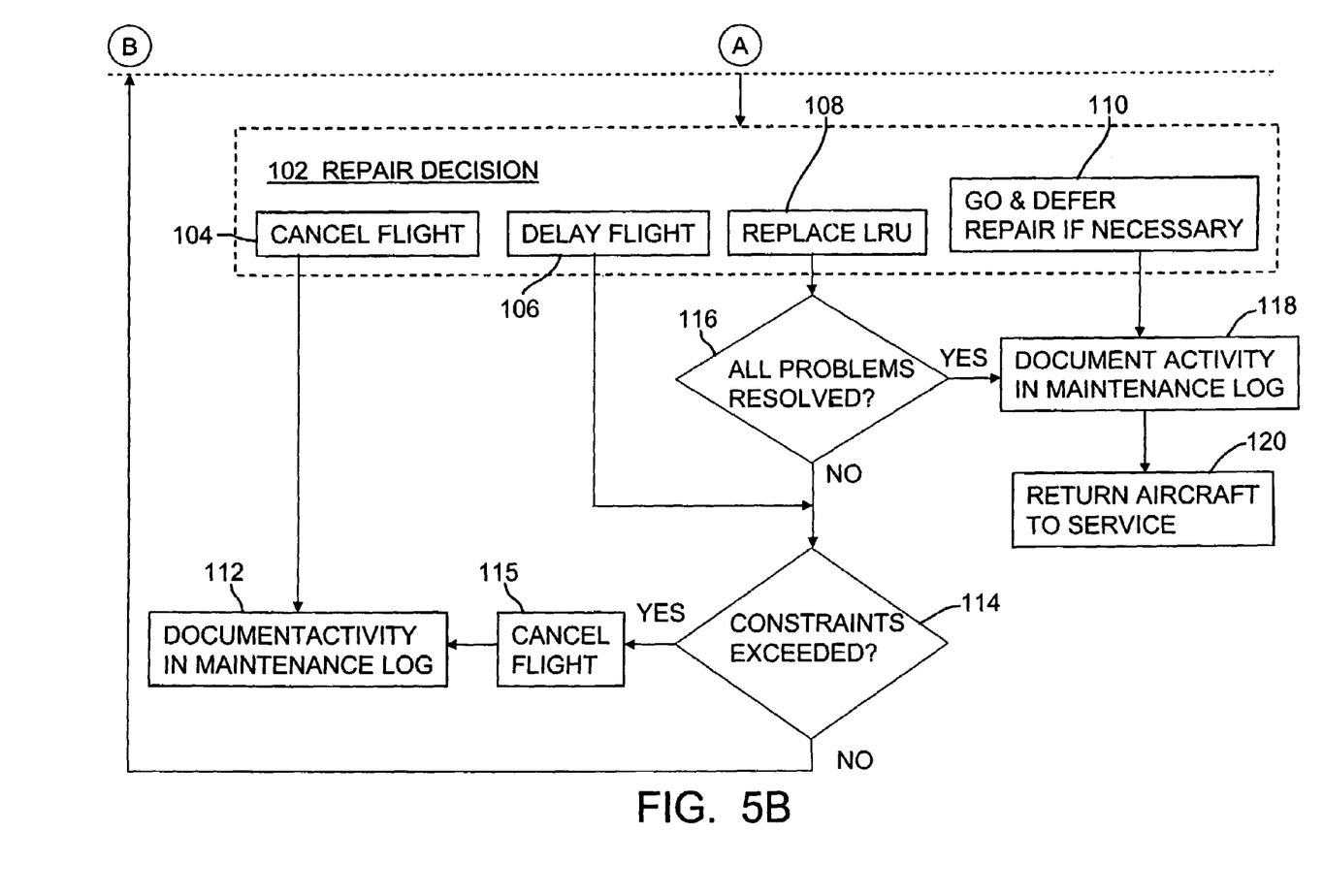

By way of example, the operation of a diagnostic system of one embodiment will be hereinafter described and illustrated by the flowchart of FIGS. 5A and 5B. Upon beginning a diagnostic session, identifying information for the aircraft (e.g., tail number) is entered into the diagnostic system 10 at step 80. Next, the observed symptoms, most of which may be obtained from the pilot logbook or the crew report, are entered into the diagnostic system 10 at step 82.

The information entered at steps 80 and 82 may be entered manually via the interface or automatically via the bi-directional link 18 linking the aircraft 16 and the diagnostic system 10. In addition to entering the observed symptoms, which become a part of the inbound faults, the user can also enter other information, if available. For example, the user can enter information pertaining to the configuration of the aircraft 16, such as flaps down. The user can also enter the operating environment of the aircraft 16, such as operating in extreme cold or on normal paved runways, and the flight stage of the aircraft 16, such as climb or cruise, at the time of the problem.

Upon entering all of the symptoms and any other information relevant to the diagnostic procedure, the diagnostic system 10 executes the extended VOI diagnostic model at step 84. At step 86, the diagnostic system 10 identifies and prioritizes suspect components based upon the relative likelihood of casualty, i.e., that the respective suspect components caused the observed symptoms.

At step 88, the diagnostic system 10 identifies and prioritizes one or more tests having a positive net VOI that can be performed in order to refine the identification and prioritization of the suspect components. The tests are also prioritized based upon the value of the information provided by the test, which, in turn, is based upon the differentiation that each test can provide towards differentiating the suspect component listed first (i.e., the suspect component with the greatest associated probability) from the remainder of the suspect components.

Now that the suspect components and possible tests have been identified and prioritized, the diagnostic system 10 accesses one or more of the databases 26 through 32 at step 90. Using the database information, the system 10 makes a test decision at step 92. That is, the diagnostic system 10 determines an optimal test to be performed (step 94) or that testing should stop (step 96). As described earlier, the diagnostic system 10 may determine that testing should stop, for example, if no test remains with a positive net VOI or if the estimated sum of costs and time delays for the testing exceeds the time deadlines and/or costs limits.

Step 98 includes performing the optimal test identified by the diagnostic system at step 94. The test outcome is entered into the diagnostic system 10 at step 100. Steps 84 though 92 are then repeated but this time the operations are based not only upon the observed symptoms, but also upon the outcome of the test entered at step 100.

Once the diagnostic system 10 determines that testing should stop at step 92, the diagnostic system 10 then addresses the repair decision at step 102. That is, the diagnostic system 10 determines the optimal remediation action in accordance with the extended VOI diagnostic model, in the manner more fully described above and shown in the Table. At step 102, the diagnostic system 10 determines whether to cancel the flight (step 104), delay the flight (step 106), replace the LRU or other suspect component (step 108), or go and defer the repair if necessary (step 110).

If the flight is cancelled (step 104), the diagnosis session is preferably documented (step 112) in an electronic maintenance log 34 (FIG. 1) and the diagnosis session comes to an end.

If the flight is delayed (step 106), the diagnostic system 10 determines whether the time and cost constraints have been exceeded (step 114). If so, the flight is cancelled (step 115), the diagnosis session is preferably documented (step 112) in the electronic maintenance log 34, and the diagnosis session comes to an end. However, if the time deadlines, cost functions, and/or cost limits have not been exceeded, the process may return to step 84.

If the LRU or other suspect component is repaired or replaced (step 108), then a determination is made as to whether all problems have been resolved (step 116). If so, the diagnosis session is preferably documented (step 118) in the electronic maintenance log 34. The aircraft 16 is then released for takeoff or otherwise returned to service at step 120. However, if all problems have not been resolved (step 116) by the component repair or replacement, the process may return to step 84 if cost constraints and time deadlines have not been exceeded (step 114). If cost constraints and time deadlines have been exceeded though and problems remain, then the flight is cancelled (step 115), the diagnosis session is preferably documented (step 112) in the electronic maintenance log 34, and the diagnosis session comes to an end.

If the repair decision (step 102) is to go and defer the repair if necessary (step 110), the diagnosis session is preferably documented (step 118) in the electronic maintenance log 34. The aircraft 16 is then released for takeoff or otherwise returned to service at step 120. If any actions are deferred, the diagnostic system 10 preferably notes the deferred actions and provides appropriate warnings to subsequently alert the mechanic of the need to perform the deferred action.

Typically, separate Bayesian networks are developed for each subsystem, although, since some components may be part of two or more subsystems, the Bayesian networks for the different subsystems can be interconnected. As such, execution of the extended VOI diagnostic model causes each Bayesian network to be investigated, typically in a parallel manner, to determine which subsystems may be faulty.

Accordingly, various implementations of the present invention substantially improve the process for diagnosing and troubleshooting large complex systems, such as aircraft. More specifically, various implementations of the present invention allow for reliable troubleshooting and diagnosis during the aircraft preflight dispatch problem. Indeed, the reliability provided by such implementations allows for substantial reductions in the number of components that are replaced that are actually functioning properly, which can otherwise add significant costs to airline maintenance operations.

In addition, various implementations of the present invention automate the decision-making as to the optimal maintenance action to take during the aircraft preflight dispatch problem. Having a diagnostic system determine the optimal maintenance action instead of aircraft personnel (e.g., mechanic, etc.) eliminates, or at least substantially reduces, the risk of exceeding one or more of the variables associated with aircraft preflight dispatch, such as cost functions, cost limits, time deadlines, and/or MEL guidelines. Accordingly, various implementations of the present invention allow for significant reductions in the number of aircraft delays and cancellations.

Implementations of the invention will be applicable to any of a wide range of mobile platforms, and especially aircraft (e.g., but not limited to, fighter jets, commercial jets, private jets, propeller powered aircraft, among others) regardless of the manner in which the aircraft is piloted (e.g., directly, remotely, via automation, in a combination thereof, among others). Accordingly, the specific references to aircraft herein should not be construed as limiting the scope of the present invention to only one specific form/type of aircraft. In addition, the present invention could readily be adapted for use with maintenance troubleshooting operations for other types of mobile platforms and vehicles where rapid troubleshooting and repair is needed as well as other decision-making problems when time is critical. For example, an implementation of the present invention can be adapted to the flight disruption management problem that involves making in-flight decisions (e.g., returning to departure aircraft, locating and landing at an intermediate location, continuing onward to scheduled destination, etc.) based upon variables such as a passenger's worsening health condition, a component failure, an expected component failure, etc. Or for example, an implementation of the present invention could also be adapted for use with the spacecraft launch management problems wherein decisions must be made such as continuing with a countdown to launch, aborting a launch sequence, etc.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. A method enabling multistage decision making in preflight dispatch of a mobile platform, the method comprising:
    extending an entropy-based value of information (VOI) diagnostic model to preflight dispatch to accommodate one or more variables associated with preflight dispatch of a mobile platform;
    receiving at least one input relating to one or more observed symptoms indicative of one or more failed components of the mobile platform;
    automatically determining a maintenance action for the mobile platform in accordance with the extended VOI diagnostic model and the one or more observed symptoms;
    wherein the automatically determining includes:
        correlating the at least one input relating to the one or more observed symptoms with one or more suspect components each capable of causing the one or more observed symptoms upon failure in accordance with the extended VOI diagnostic model;
        prioritizing the one or more suspect components based upon a relative likelihood that the respective suspect components caused the one or more observed symptoms;
        identifying and prioritizing one or more tests that can each be performed to refine the prioritization of the one or more suspect components; and
        using the prioritized listing of tests to identify a test to perform or determine that testing should stop.

2. The method of claim 1, wherein the construction of the entropy-based VOI diagnostic model and the extended VOI diagnostic model are based upon a Bayesian network.

3. The method of claim 1, wherein the automatically determining includes automatically determining an optimal maintenance action for the mobile platform in accordance with the extended VOI diagnostic model and the one or more observed symptoms.

4. The method of claim 1, wherein the automatically determining includes automatically prioritizing one or more tests and remedial actions for the mobile platform over multiple stages in accordance with the extended VOI diagnostic model and the one or more observed symptoms.

5. The method of claim 1, wherein the maintenance action includes at least one of:
    performing a test to refine a prioritization of the plurality of suspect components;
    repairing a suspect component;
    replacing a suspect component;
    deferring maintenance on a suspect component;
    delaying a flight;
    canceling a flight; and
    canceling a flight and replacing the mobile platform.

6. The method of claim 1, further comprising:
    receiving at least one input relating to an outcome of a test; and
    re-determining the maintenance action in light of the outcome of the test.

7. The method of claim 1, further comprising identifying the one or more variables associated with preflight dispatch.

8. The method of claim 1, wherein the one or more variables accommodated by the extended VOI diagnostic model include at least one of:
    a decision parameter;
    a utility function;
    a constraint;
    a cost function;
    a cost limit;
    a time deadline;
    an airworthiness guideline;
    maintenance crew expertise;
    labor availability;
    a future destination of the mobile platform;
    repair equipment availability; and
    component availability.

9. The method of claim 1, wherein the one or more variables accommodated by the extended VOI diagnostic model include:
    a test decision; and
    a repair decision interleaved with the test decision.

10. The method of claim 9, wherein:
    the test decision includes at least one of:
        performing a test to refine a prioritization of the plurality of suspect components; and
        stopping testing and addressing the repair decision;
    the repair decision includes at least one of:
        repairing a suspect component;
        replacing a suspect component;
        deferring maintenance on a suspect component;
        delaying a flight;
        canceling a flight; and
        canceling a flight and replacing the mobile platform.

11. The method of claim 1, wherein the entropy-based VOI diagnostic model is constructed based upon at least one of systemic information relating to components of the mobile platform and input-output relationships of the components, experience-based information relating to direct relationships between component failures and observed symptoms, and factual information relating to component reliability.

12. A method enabling multistage decision making in preflight dispatch of a mobile platform, the method comprising:
    extending an entropy-based value of information (VOI) diagnostic model to preflight dispatch to accommodate one or more variables associated with preflight dispatch of a mobile platform;
    receiving at least one input relating to one or more observed symptoms indicative of one or more failed components of the mobile platform;
    automatically determining a maintenance action for the mobile platform in accordance with the extended VOI diagnostic model and the one or more observed symptoms;
    wherein the one or more variables accommodated by the extended VOI diagnostic model includes a test decision and a repair decision interleaved with the test decision;
    wherein the test decision includes at least one of:
        performing a test to refine a prioritization of the plurality of suspect components; and
        stopping testing and addressing the repair decision;

wherein the repair decision includes at least one of:
repairing a suspect component;
replacing a suspect component;
deferring maintenance on a suspect component;
delaying a flight;
canceling a flight; and
canceling a flight and replacing the mobile platform;
wherein the test decision is stopping testing and addressing the repair decision when no test having a positive value of information (VOI) or an estimated time and cost of completion within cost and time constraints prescribed for dispatch of the mobile platform can be identified.

13. A method enabling multistage decision making in preflight dispatch of a mobile platform, the method comprising:
extending an entropy-based value of information (VOI) diagnostic model to preflight dispatch to accommodate one or more variables associated with preflight dispatch of a mobile platform;
receiving at least one input relating to one or more observed symptoms indicative of one or more failed components of the mobile platform;
automatically determining a maintenance action for the mobile platform in accordance with the extended VOI diagnostic model and the one or more observed symptoms;
wherein the one or more variables accommodated by the extended VOI diagnostic model includes a test decision and a repair decision interleaved with the test decision;
wherein the test decision includes at least one of:
performing a test to refine a prioritization of the plurality of suspect components; and
stopping testing and addressing the repair decision;
wherein the repair decision includes at least one of:
repairing a suspect component;
replacing a suspect component;
deferring maintenance on a suspect component;
delaying a flight;
canceling a flight; and
canceling a flight and replacing the mobile platform;
wherein the test to perform includes a positive net VOI and an estimated time and cost of completion within cost and time constraints associated with the dispatch of the mobile platform.

14. A method enabling multistage decision making in a maintenance troubleshooting operation, the method comprising:
extending an entropy-based value of information (VOI) diagnostic model constructed based upon at least one of systemic information relating to components of a mobile platform and input-output relationships of the components, experience-based information relating to direct relationships between component failures and observed symptoms, and factual information relating to component reliability, the extended VOI diagnostic model accommodating one or more variables associated with the maintenance troubleshooting operation;
receiving at least one input relating to one or more observed symptoms indicative of one or more failed components of the mobile platform; and
automatically determining a maintenance action for the mobile platform in accordance with the extended VOI diagnostic model and the one or more observed symptoms.

15. The method of claim 14, wherein the extending includes extending the entropy-based value of information (VOI) diagnostic model to preflight dispatch to accommodate one or more variables associated with preflight dispatch of the mobile platform.

16. The method of claim 14, wherein the construction of the entropy-based VOI diagnostic model and the extended VOI diagnostic model are based upon a Bayesian network.

17. The method of claim 14, wherein the automatically determining includes automatically determining an optimal maintenance action for the mobile platform in accordance with the extended VOI diagnostic model and the one or more observed symptoms.

18. The method of claim 14, wherein the automatically determining includes automatically prioritizing one or more tests and remedial actions for the mobile platform over multiple stages in accordance with the extended VOI diagnostic model and the one or more observed symptoms.

19. The method of claim 14, wherein the maintenance action includes at least one of:
performing a test to refine a prioritization of the plurality of suspect components;
repairing a suspect component;
replacing a suspect component;
deferring maintenance on a suspect component;
delaying a flight;
canceling a flight; and
canceling a flight and replacing the mobile platform.

20. The method of claim 14, wherein the automatically determining includes:
correlating the at least one input relating to the one or more observed symptoms with one or more suspect components each capable of causing the one or more observed symptoms upon failure in accordance with the extended VOI diagnostic model;
prioritizing the one or more suspect components based upon a relative likelihood that the respective suspect components caused the one or more observed symptoms;
identifying and prioritizing one or more tests that can each be performed to refine the prioritization of the one or more suspect components; and
using the prioritized listing of tests to identify a test to perform or determine that testing should stop.

21. The method of claim 14, further comprising:
receiving at least one input relating to an outcome of a test; and
re-determining the maintenance action in light of the outcome of the test.

22. The method of claim 14, further comprising:
receiving at least one input relating to a remedial action undertaken with respect to at least one suspect component; and
re-determining the maintenance action in light of the remedial action.

23. The method of claim 14, further comprising identifying the one or more variables associated with the maintenance troubleshooting operation.

24. The method of claim 14, wherein the one or more variables accommodated by the extended VOI diagnostic model includes at least one of:
a decision parameter;
a utility function;

a constraint;
a cost function;
a cost limit;
a time deadline;
an airworthiness guideline;
maintenance crew expertise;
labor availability;
a future destination of the mobile platform;
repair equipment availability; and
component availability.

25. The method of claim 14, wherein the one or more variables accommodated by the extended VOI diagnostic model includes:
   a test decision; and
   a repair decision interleaved with the test decision.

26. The method of claim 25:
   wherein the test decision includes at least one of:
      performing a test to refine a prioritization of the plurality of suspect components; and
      stopping testing and addressing the repair decision;
   wherein the repair decision includes at least one of:
      repairing a suspect component;
      replacing a suspect component;
      deferring maintenance on a suspect component;
      delaying a flight;
      canceling a flight; and
      canceling a flight and replacing the mobile platform.

* * * * *